US012433298B2

(12) United States Patent
Maunsell et al.

(10) Patent No.: US 12,433,298 B2
(45) Date of Patent: Oct. 7, 2025

(54) CARCASS PROCESSING MACHINE AND ASSEMBLIES

(71) Applicant: Robotic Technologies Limited, Dunedin (NZ)

(72) Inventors: Stephen Robert Maunsell, Mosgiel (NZ); Steven John Fern, Dunedin (NZ); Ian Joseph Lormans, Dunedin (NZ); Liam James Hopkins, Winton (NZ)

(73) Assignee: Robotic Technologies Limited, Dunedin (NZ)

( * ) Notice: Subject to any disclaimer, the term of this patent is extended or adjusted under 35 U.S.C. 154(b) by 0 days.

(21) Appl. No.: 19/110,743

(22) PCT Filed: Sep. 11, 2023

(86) PCT No.: PCT/NZ2023/050094
§ 371 (c)(1),
(2) Date: Mar. 11, 2025

(87) PCT Pub. No.: WO2024/058674
PCT Pub. Date: Mar. 21, 2024

(65) Prior Publication Data
US 2025/0261656 A1 Aug. 21, 2025

(30) Foreign Application Priority Data

Sep. 12, 2022 (NZ) ........................................ 792240

(51) Int. Cl.
*A22C 17/00* (2006.01)
*A22C 17/04* (2006.01)
(52) U.S. Cl.
CPC .......... *A22C 17/0033* (2013.01); *A22C 17/04* (2013.01)

(58) Field of Classification Search
CPC ............................ A22C 17/0033; A22C 17/04
(Continued)

(56) References Cited

U.S. PATENT DOCUMENTS 6,129,625 A 10/2000 Cate et al.
9,687,007 B2 * 6/2017 Inoue ....................... B26D 3/24
(Continued)

FOREIGN PATENT DOCUMENTS

EP 2210495 A1 7/2010
GB 2581553 A 8/2020

OTHER PUBLICATIONS

International Search Report received in PCT Application No. PCT/NZ2023/050094 dated Dec. 19, 2023 in 13 pages.

*Primary Examiner* — Richard T Price, Jr.
(74) *Attorney, Agent, or Firm* — Knobbe Martens Olson & Bear LLP

(57) ABSTRACT

A carcass processing machine and carcass processing assemblies for processing sections of carcass having vertebrae in them, such as loin sections. The carcass processing machine includes an assembly for removing portions of meat from the ventral side of the vertebrae. This assembly has a knife with a cutting feature that varies in height. This assembly also has a rotating member for removing a portion of meat. The carcass processing machine includes an assembly for removing portions of meat from the dorsal side of the vertebrae. This assembly has a blade, which may be a plough blade, that cuts meat from the transverse processes and can moved by another blade that rides over the transverse processes near their bases. The plough blade has a blunt tip. This assembly can have another blade that is movable relative to the blade that rides over the transverse processes.

20 Claims, 16 Drawing Sheets

(58) Field of Classification Search
USPC .......................................................... 452/136
See application file for complete search history.

(56) References Cited

U.S. PATENT DOCUMENTS

2005/0274245 A1 12/2005 Biggs et al.
2022/0022470 A1 1/2022 Jacobs et al.

\* cited by examiner

Section A-A

CARCASS PROCESSING MACHINE AND ASSEMBLIES

FIELD

This invention relates to assemblies and machines suitable for processing carcasses, for example those of sheep, goats, pigs or bovine animals. Carcass processing machines are used for cutting meat from the bones of a carcass, which can include cutting meat from vertebrae in the region of the abdomen. In some examples, the assemblies and machines may be particularly suited to the processing of lamb carcasses to separate the meat from the vertebrae on a shortloin saddle but may also find application in the processing of other meat products including mutton, hogget, goat, pork and beef and for separating meat from different sections of carcass.

BACKGROUND

In "loin boning" meat is removed from the lower section of the vertebra of an animal, typically from a shortloin saddle section of the carcass. This can involve removing tenderloins from the ventral side of the vertebrae and removing eye muscles (also known as boneless loins), to obtain boneless loin meat, from the dorsal side of the vertebrae. The eye muscle is removed from the spinous processes, mamillary processes and the transverse processes of the vertebrae.

NZ Patent No. 757048, the entire contents of which are incorporated herein by reference, describes a loin boning machine.

SUMMARY

According to one example embodiment there is provided a carcass processing assembly for at least partly separating a portion of meat from a section of carcass, the section of carcass including vertebrae, the carcass processing assembly including:
   one or more blades configured to partly separate the portion of meat from the section of carcass;
   a rotating member downstream from at least one of the one or more blades, the rotating member configured to contact the portion of meat after the one or more blades partly separate the portion of meat from the section of carcass; and
   a drive assembly configured to drive movement of the rotating member relative to the section of carcass such that a part of the rotating member in contact with the partly separated portion of meat moves outwardly from the vertebrae to urge the partly separated portion of meat away from the vertebrae.

According to another example embodiment there is provided a carcass processing assembly for at least partly separating a portion of meat from a section of carcass, the section of carcass including vertebrae, the carcass processing assembly including:
   an elongate knife arranged to contact the section of carcass, the knife having a base, a length along the elongate knife, a cutting feature at an edge of the knife and extending along the length of the knife, and a height in the direction from the base to the cutting feature, wherein the knife includes one or more knife blades; and
   transportation means configured to move the section of carcass along the knife to cut the section of carcass.

According to another example embodiment there is provided a carcass processing assembly for at least partly separating a portion of meat from a section of carcass, the section of carcass including vertebrae, the carcass processing assembly including:
   a plough blade arranged to at least partly separate the portion of meat from transverse processes of the vertebrae;
   wherein the plough blade is arranged such that, during processing of the carcass, a tip of the plough blade is located towards the vertebral bodies of the vertebrae; and
   wherein the tip of the plough blade is rounded.

According to another example there is provided a carcass processing assembly for at least partly separating a portion of meat from a dorsal side of a section of carcass, the section of carcass including vertebrae, the carcass processing assembly including:
   a first movably mounted blade arranged to at least partly separate meat from the vertebrae, the first movably mounted blade arranged to follow a dorsal surface of the vertebrae between mamillary processes and transverse processes of the vertebrae, wherein the first movably mounted blade is angled and positioned to fit around the mamillary processes of the vertebrae; and
   a second movably mounted blade arranged to at least partly separate meat from the vertebrae, the second movably mounted blade arranged to follow a dorsal surface of the vertebrae between spinous processes and mamillary processes of the vertebrae;
   wherein the first and second movably mounted blades are mounted to be movable relative to each other.

According to another example there is provided a carcass processing assembly for at least partly separating a portion of meat from a dorsal side of a section of carcass, the section of carcass including vertebrae, the carcass processing assembly including:
   a first movably mounted blade arranged to at least partly separate meat from the vertebrae, the first movably mounted blade arranged to follow a dorsal surface of the vertebrae; and
   a second movably mounted blade arranged to at least partly separate meat from the dorsal side of the transverse processes of the vertebrae;
   a linkage between the first movably mounted blade and the second movably mounted blade, configured such that movement of the first movably mounted blade causes movement of the second movably mounted blade.

According to some examples there is provided a carcass processing assembly or a carcass processing machine according to any one of claims 2 to 12, 14 to 22, 24, 26-28, or 30 to 42.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings, which are incorporated in and constitute part of the specification, illustrate embodiments of the invention and together with the general description of the invention given above and the detailed description of embodiments given below, serve to explain the principles of the invention.

DETAILED DESCRIPTION

Figure 1:
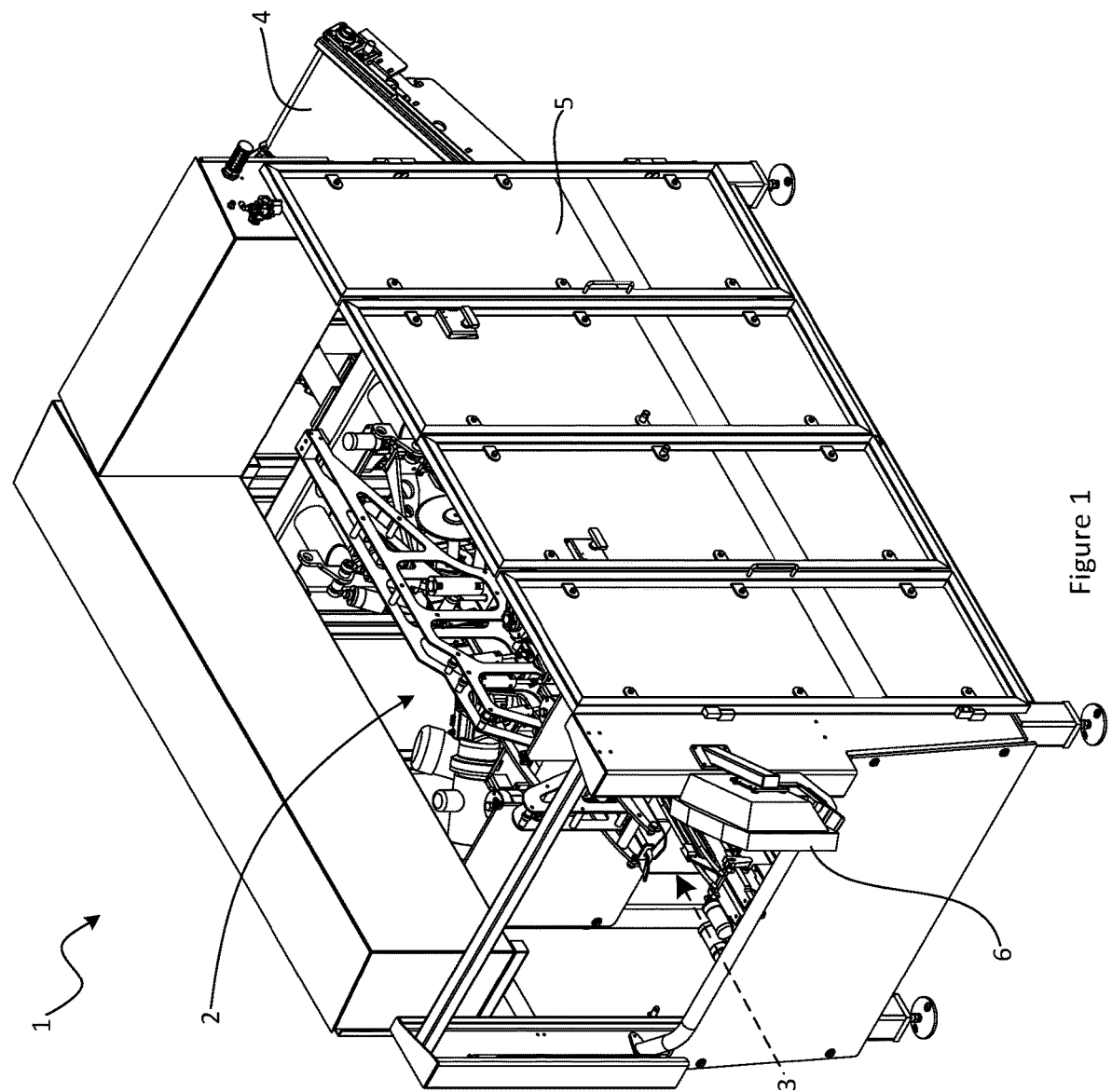
FIG. 1 is an isometric view of a carcass processing machine according to one example.

FIG. 1 illustrates a carcass processing machine 1 according to one example.

The carcass processing machine includes one or more carcass processing assemblies in the region generally indicated by the arrow 2. A section of carcass can move through the machine 1 in the direction indicated by the arrow 3. Portions of meat can be removed from the section of carcass by the processing assembly or assemblies along the way.

The carcass processing machine 1 may include a conveyor 4 for receiving and conveying meat removed from the section of carcass during processing. The conveyor may be in the form of a belt conveyor. The conveyor 4 may be located below one or more of the processing assemblies. In this case, meat removed from the section of carcass can fall under gravity onto the conveyor 4.

The carcass processing machine 1 may process any of a range of sections of carcass that include vertebrae or partial vertebrae (i.e. sections of carcass that include at least some of the spine of the animal). The carcass processing machine 1 may be particularly well suited to processing loin sections, and more particularly shortloin saddles. The carcass processing machine 1 may be suitable for processing sections of carcass from various different types of animal, including sheep (lamb, mutton or hogget), beef, pork or goat. Because different animal types have different anatomies, various parameters of the machine 1 may be selected or designed to accommodate the different animals. For example, the size, angles and positions of blades can be tailored to the different vertebra geometries of the animals. In some cases, only one side (i.e. the left or right side) of a section of carcass may be processed. For example, in beef processing the carcass is typically split along the midline (into a "side" of beef) before meat is removed from the loin. In these examples, the section of carcass may be referred to herein as a "half section" (as opposed to a "full section"). It will be understood that in these cases, the vertebrae of the section of carcass may be partial vertebrae (i.e. the left or right side of the vertebrae).

Figure 15:
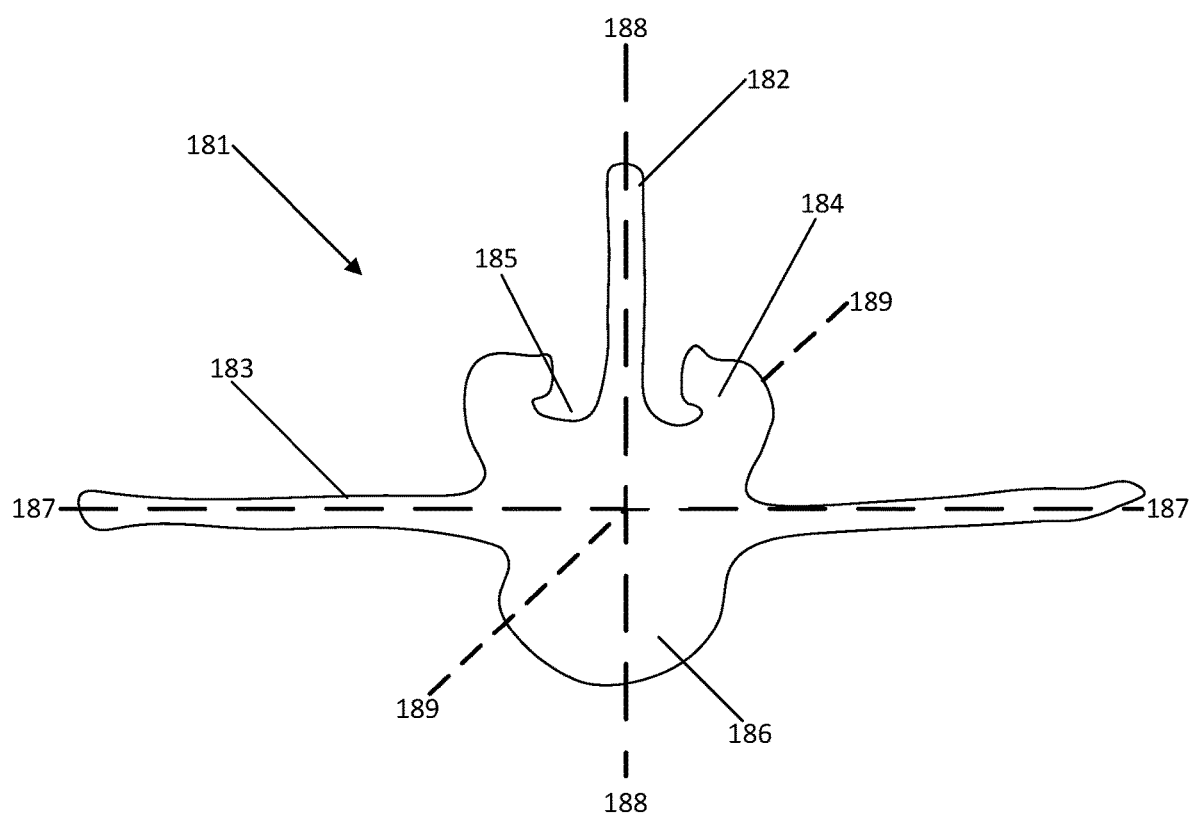
FIG. 15 shows an animal vertebra.

FIG. 15 depicts a typical vertebra 181 of an animal. The vertebra 181 generally has a ventral side, which is towards the underside of the animal in the case of a quadrupedal animal, and a dorsal side, which is towards the back of the animal—away from the underside of a quadrupedal animal. Projecting from the dorsal side of the vertebra 181 towards the top of the page is the spinous process 182, sometimes known as the "featherbone". Projecting laterally from the vertebra 181 are the transverse processes 183. Between the spinous process 182 and the transverse processes 183 are the mamillary processes 184. The region between each mamillary process 184 and the spinous process 182 is referred to as the "shoulder" 185. The vertebra 181 has an axis 187-187, referred to herein as the left-right axis, that traverses the left and right sides of the vertebra 181. The vertebra also has an axis 188-188, referred to herein as the dorso-ventral axis, that traverses the dorsal and ventral sides of the vertebra 181. The vertebra also has another axis 189-189, referred to herein as the antero-posterior axis, that traverses the anterior and posterior ends of the vertebra 181. In the case of a quadruped animal, the left-right axis 187-187 and the dorso-ventral axis 188-188 may lie substantially in what is known as the transverse plane, the left-right axis 187-187 and the antero-posterior axis 189-189 may lie substantially in what is known as the coronal plane, and the dorso-ventral axis 188-188 and the antero-posterior axis 189-189 may lie substantially in what is known as the sagittal plane.

Turning back to FIG. 1, the carcass processing machine 1 may include one or more shields about its periphery. Shields may help to prevent damage to the machine or injury to workers by stopping workers or foreign objects from entering the region 2 of the meat processing assemblies. Shields may help to reduce mess produced by the carcass processing machine in use by at least partly blocking blood, tissue or bone from exiting the machine. The shield(s) may be in the form of one or more panels, mesh, slats, or a grate, for example. In the example of FIG. 1, the shields are panels 5. The panels 5 may be removable or openable to allow for easier access to the region 2.

The carcass processing machine may include a user interface 6. The user interface 6 may allow the user to control operation of the machine 1, for example to start or shut down the machine 1, to start or stop a conveyor, to start or stop transportation means, to start or stop individual blades, or to control the speed of a conveyor, transportation means or one or more blades. The user interface may present operational information regarding the machine 1 to the user.

For example, the user interface 6 may indicate whether the machine 1 is operating or shut down, whether a conveyor, transportation means or one or more blades is operating or stopped, the speed of operation of one or more conveyors, transportation means or blades, fault or warning information, or a count of sections of carcass processed. The user interface 6 may present images taken from inside the region 2, allowing a worker to monitor the operation of the machine. This may include still images or video taken from one or more parts of the processing assembly or assemblies. The user interface 6 may include one or more buttons, switches, visual displays, touch-sensitive input devices, and/or audio output devices, for example.

Figure 2:
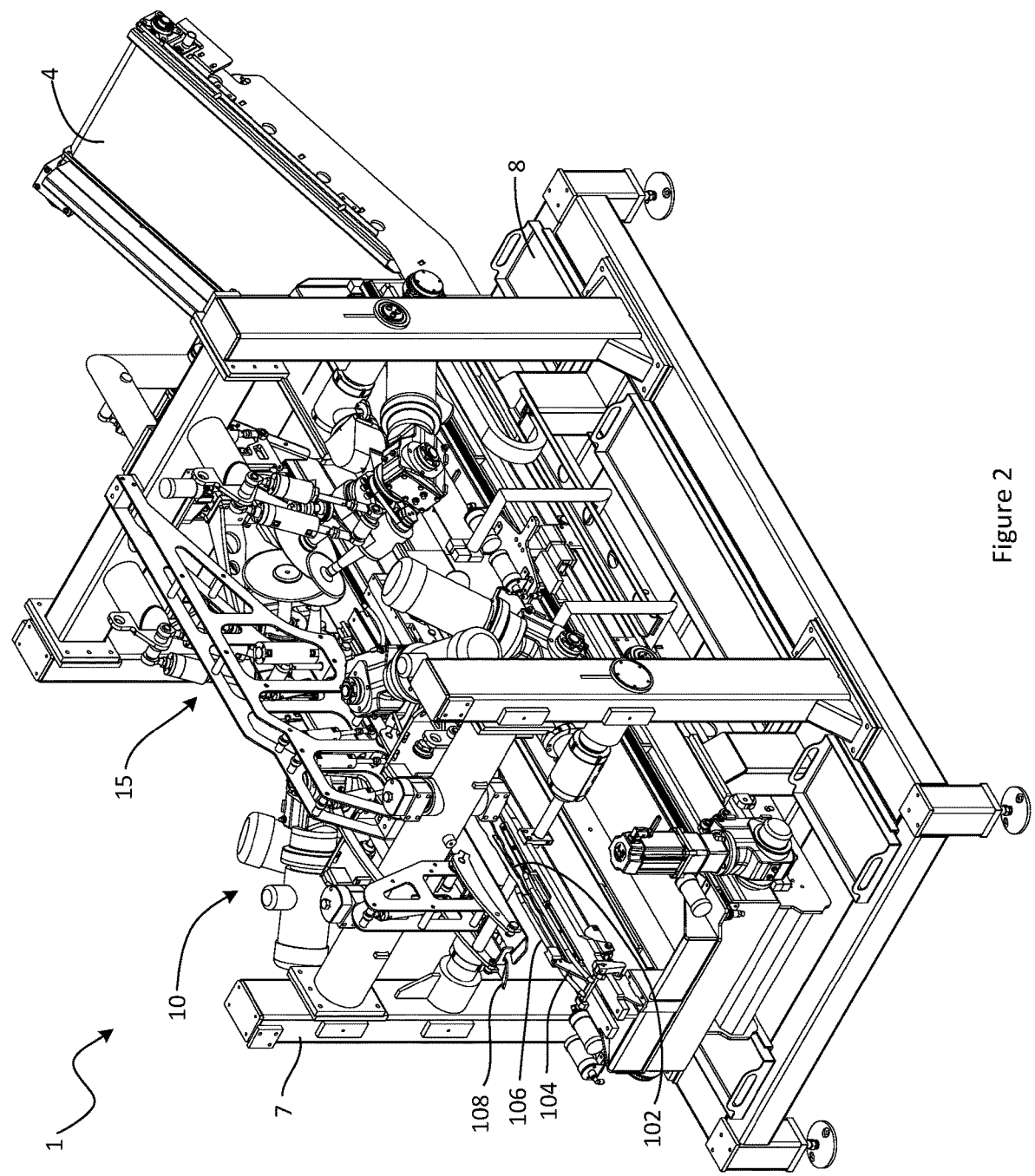
FIG. 2 is an isometric view of the carcass processing machine of FIG. 1 with some parts hidden.

In FIG. 2, outer parts such as the panels and user interface have been hidden to better show the interior components of the machine 1. The machine 1 includes a frame 7 to which other parts of the machine 1 may be mounted or, as in the case of the trays 8, on which other parts of the machine 1 can be supported.

In this example, the carcass processing machine 1 includes two main processing assemblies 10 and 15. The first assembly 10 is configured to remove meat from the ventral side of the section of carcass. The second assembly 15 is configured to remove meat from the dorsal side of the carcass. The first carcass processing assembly 10 may be configured to remove a tenderloin portion of meat from a section of carcass. The second processing assembly 15 may be configured to remove a boneless loin or eye muscle portion of meat (also known as a backstrap) from the section of carcass. Although shown together in a single machine 1, the first processing assembly 10 and second processing assembly 15 may be provided as separate apparatuses. These assemblies are described in more detail below.

The carcass processing machine 1 of the figures is configured to process both sides of a "full section" of carcass—i.e. one including both the left and right sides of the section of carcass—simultaneously. To this end, the carcass processing machine 1 has similar components and assemblies arranged on both sides of the machine 1. In other examples in which the machine only processes one side of the section of carcass—either because the section of carcass is a half section or because the machine is only required to remove meat from one lateral side of a full section of carcass, the components and assemblies can be provided on only one side of the machine to process only one side of the section of carcass. The description of the exemplary carcass processing machine 1 herein is given in the context of a machine that processes both sides of a section of carcass simultaneously, but the description applies equally to machines configured to process only one side of a section of carcass, with appropriate modifications. In particular, processing components of the machine 1 that are arranged in pairs, with one member of each pair on each side of the section of carcass, may be replaced by one member of each pair (i.e. all the left-hand side members or all the right-hand side members). References to one of a pair of elements (e.g. blades, rotating members, mounts) apply equally to the other element of the pair unless otherwise specified or clear from the context.

The carcass processing machine 1 is arranged to process the section of carcass with its ventral side oriented downwards and the spine lying substantially along the path of travel of the section of carcass through the carcass processing machine 1. Unless otherwise specified or clear from the context, spatial relations such as "above", "below", "vertical", "horizontal" and the like are relative to the orientation of the section of carcass, i.e. with "below" meaning "offset from in the ventral direction", "above" meaning "offset from in the dorsal direction", "vertical" meaning "aligned with the dorso-ventral axis of a vertebra of the section of carcass" and "horizontal" meaning "transverse to the dorso-ventral axis". In alternative arrangements in which the section of carcass is configured to be processed in a different orientation, for example on its side, some parts of the machine 1 may similarly be reoriented such that they have the same spatial relations to the section of carcass. Exceptions would be the conveyor 4 and trays 8 which collect material that falls onto them under gravity—these may remain below the processing assembly or assemblies in an external reference frame defined by gravity.

The machine 1 includes several parts provided to receive, hold and move the section of carcass during a processing operation. FIG. 2 shows support bars 106 onto which the section of carcass can be initially placed. Below the support bars 106 are knives 102 that the section of carcass can then be lowered onto. A pusher 104 can push the section of carcass along the knives 102 and through the first processing assembly 10. A holder 108 is also provided above the section of carcass to stabilise the section of carcass during processing in the first processing assembly 10. The holder 108 may have one or more surfaces that press against the surface of the section of carcass to restrain its movement in the vertical and lateral directions. In some examples, the holder 108 has at least one plate that is at an oblique angle to the horizontal and vertical directions to press downwards and inwards on the section of carcass. In the example of FIG. 2, which is configured to process a full section of carcass, the holder 108 has two such plates, one at each lateral side of the section of carcass. In other examples, a single plate with two faces at an angle to each other could replace the two plates of the holder 108 of FIG. 2. Alternatively, several smaller plates or bars or the like could replace the holder 108.

Also shown in FIG. 2 are trays 8. These are placed on the frame 7 below the conveyor 4 to catch material that may fall from the carcass processing assemblies 10, 15 or the conveyor 4. The trays 8 may be removable to allow easy cleaning of collected material. The trays 8 in this example have handles to facilitate easy removal and replacement.

Figure 3:
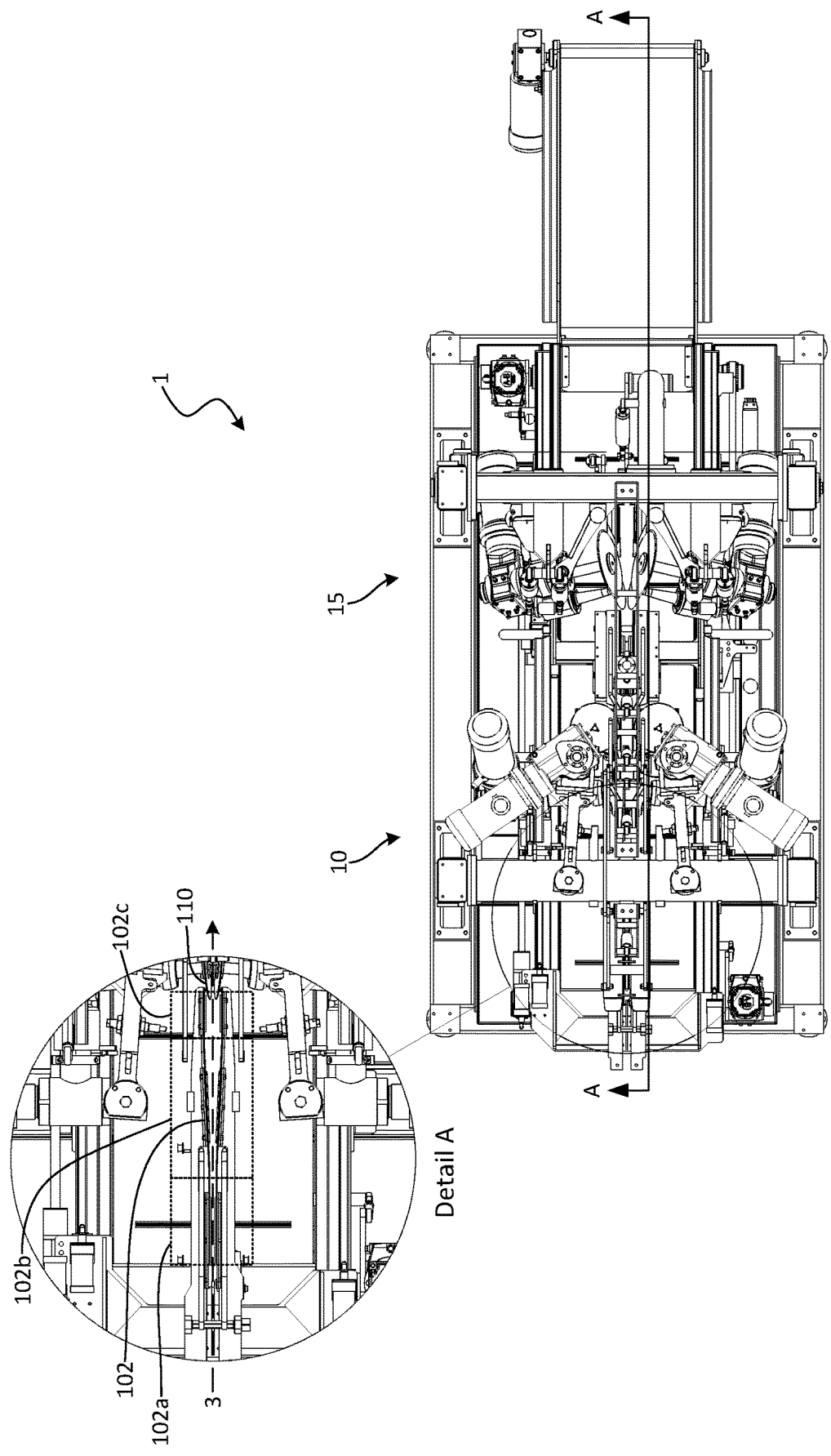
FIG. 3 is a top view showing a detail of the carcass processing machine as shown in FIG. 2.

FIG. 3 shows the carcass processing machine 1 from above, with the knives 102 of the first processing assembly 10 shown in Detail A. Referring to Detail A, the upstream end (i.e. the left in the orientation of FIG. 3) of each knife 102 is close to the line 3 indicating the nominal path of travel of the vertebral centre. The downstream end of each knife 102 is further out from the line 3. In examples with a symmetrical pair of blades 102, like the one shown in FIG. 3, the blades 102 diverge along the path of travel 3. The knives 102 may have different sections arranged at different angles to the line 3 and/or at different distances from the line 3. The blade 102 may have an angled section 102b that angles outward from line 3 along the path of travel. The blade 102 may have one or more sections that are substantially parallel to the line 3. For example, the blade 102 may have an upstream section 102a that is close to the line 3 and substantially parallel to the line 3. The length of the section 102a may be similar to or greater than the typical length of a section of carcass to be processed. The knives 102 may also have a section 102c downstream of the angled section that is substantially parallel to the line 3, but at a wider spacing than the section 102a. In the example of FIG. 3, the blades 102 each have the three sections 102a, 102b, 102c.

The knives 102 are arranged to cut into the section of carcass as it is placed on and moved across them. In some examples, the knives 102 may be substantially vertical. The section 102*a* may initiate a straight cut along the ventral side of the section of carcass, near the midline, when the section of carcass is placed on them. The holder 108 may be configured to press down with sufficient force to start the cut. As the section of carcass is moved along the knife 102 over the section 102*b*, the meat may be forced outwards from the vertebrae due to the angle of the blades 102 in this section 102*b*, "opening up" the cut. At section 102*c*, the cut is sufficiently wide to go over the blades 110. The blades 110 may then extend the cut over the vertebral bodies to the bases of the transverse processes. The blades 110 may be rotating blades configured for "climb cutting", i.e. the blades 110 may rotate in such a direction that the edge that contacts the section of carcass moves in the same direction as the section of carcass. In one example, the blades 110 may rotate at approximately 670 revolutions per minute (approximately 11 hertz). In alternative examples, a fixed (non-rotating) blade may be used. The blades 110 may be angled at a tangent to the vertebral bodies 186 on the ventral side to optimise removal of the portion of meat. The blades 110 may have a bevel on the outer side with the sharp edge adjacent the vertebrae at the base of the transverse processes. The blades 110 may be angled outward in the direction of travel from the path taken by the centre of the vertebrae. This may help to urge the portion of meat away from the vertebrae.

Also shown in FIG. 3 is the general arrangement of the first carcass processing assembly 10 and second carcass processing assembly 15. In particular, the first processing assembly 10 is upstream of the second processing assembly 15. This means that the tenderloins are removed from the section of carcass first, then the eye muscles/boneless loins are removed. In alternative examples, the assemblies may be reversed, with an eye muscle removal assembly 15 being upstream of a tenderloin removal assembly 10.

Figure 4:
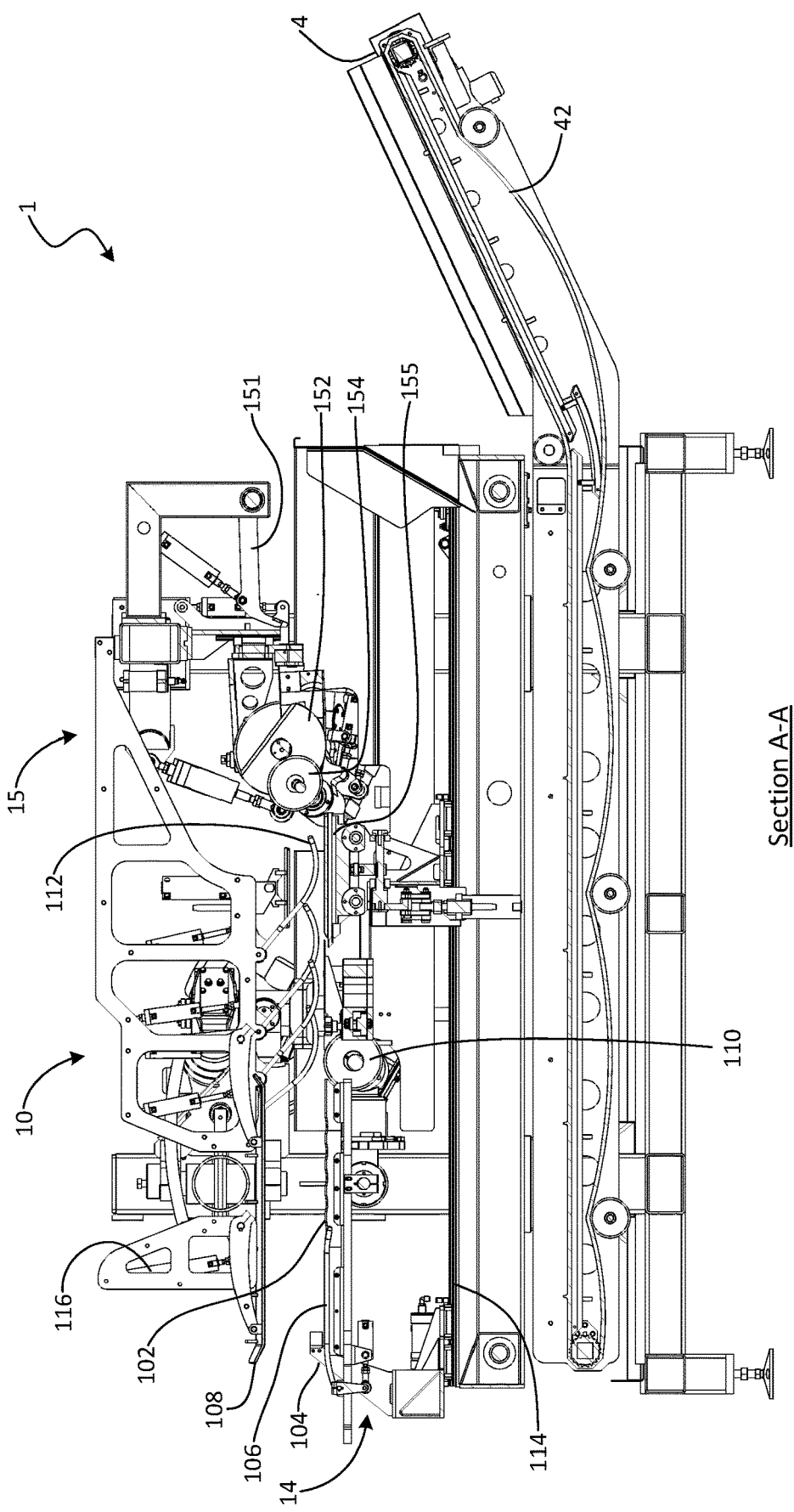
FIG. 4 is a cross sectional view of the carcass processing machine taken along line A-A of FIG. 3.

FIG. 4 shows the carcass processing machine 1 in cross section taken along the line A-A, indicated in FIG. 3.

The general progress of the section of carcass through the carcass processing machine 1 is as follows. As already discussed, the section of carcass is initially placed on the support bars 106 then lowered onto the knives 102. This may be due to the holder 108 pressing down on the section of carcass and causing the rest bars to passively pivot downwards. The movement of the holder 108 can be driven by the actuator 116, which may be a pneumatic or hydraulic cylinder. The section of carcass may then be pushed through the first assembly 10 by the pusher 104.

The section of carcass may be transferred onto the carriage 155, which may transport the section of carcass through the second processing assembly 15. One or more hold down bars 112 may be provided above the section of carcass and biased downwards, either by their own weight or by an additional biasing means such as air springs. During processing at the first carcass processing assembly 10 and the second carcass processing assembly 15, portions of meat may fall onto the conveyor 4. The conveyor may deliver the portions of meat out of the machine 1 for collection. The conveyor 4 in the example of FIG. 4 is a belt conveyor with a driven belt 42. Downstream of the second processing assembly 15, an ejector 151 may be provided to eject parts of carcass, such as vertebrae, from the carriage 155.

The pusher 104 and the carriage 155 collectively make up a transportation means 14 that conveys the section of carcass through the carcass processing machine 1. The pusher 104 and the carriage 155 may each run along a rail. In the machine 1 of FIG. 4, the pusher 104 and the carriage run along same rail 114 that extends through both processing assemblies 10 and 15. In some examples, the transportation means 14 may move the section of carcass through the processing assemblies 10, 15 at between approximately 240 mm/s and approximately 800 mm/s. Other suitable transportation means may be used. For example, in some alternative arrangements a single pusher or carriage may be provided to move the section of carcass through both processing assemblies 10 and 15. In other alternative arrangements, one or more conveyors or belts may be used in the transportation means, for example in the second carcass processing assembly 15. Various suitable combinations of the same type or different types of transportation means may be used in the carcass processing machine 1 or in the individual carcass processing assemblies 10, 15.

Figure 7:
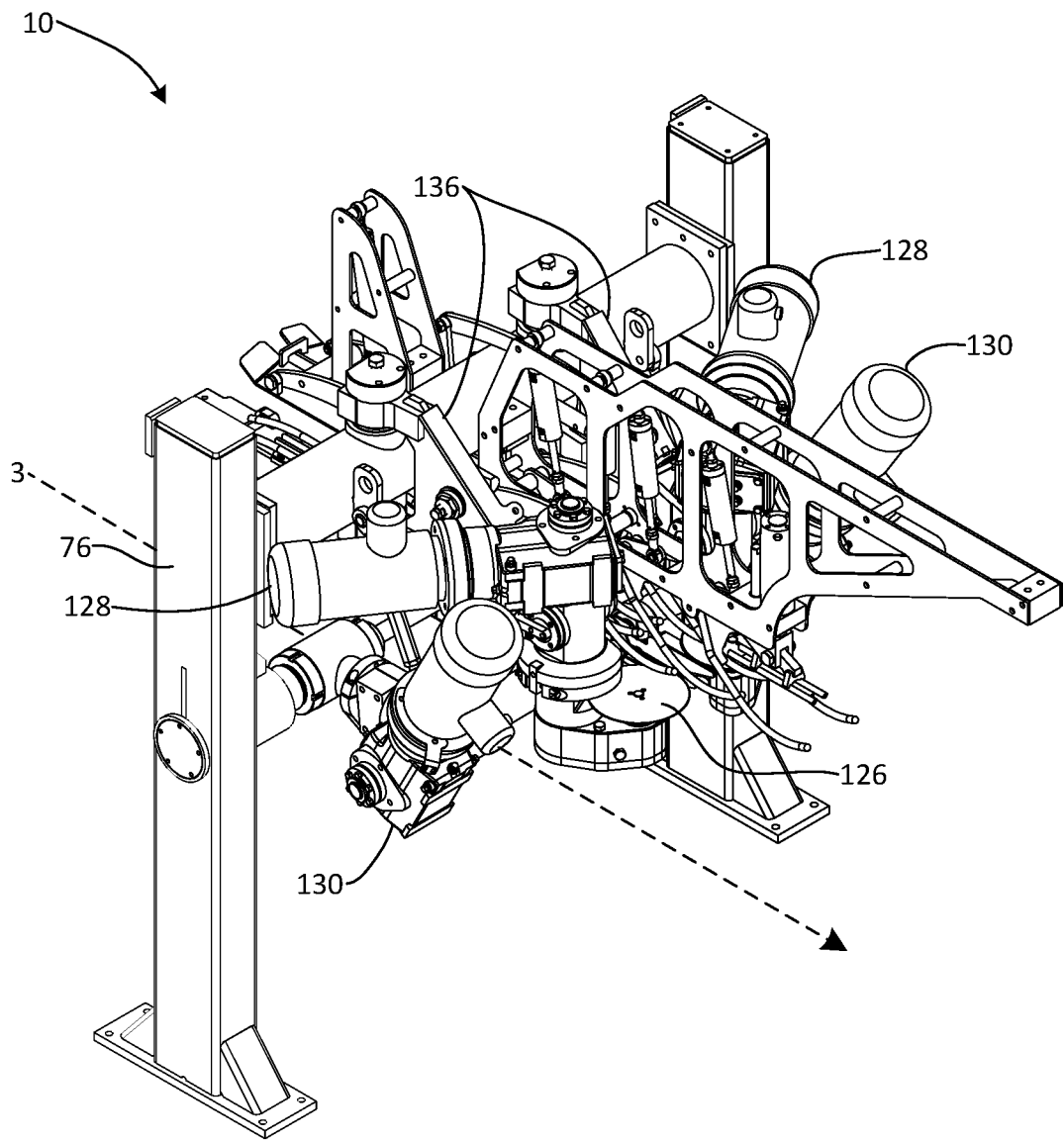
FIG. 7 is an isometric view of a first carcass processing assembly according to one example.
Figure 8:
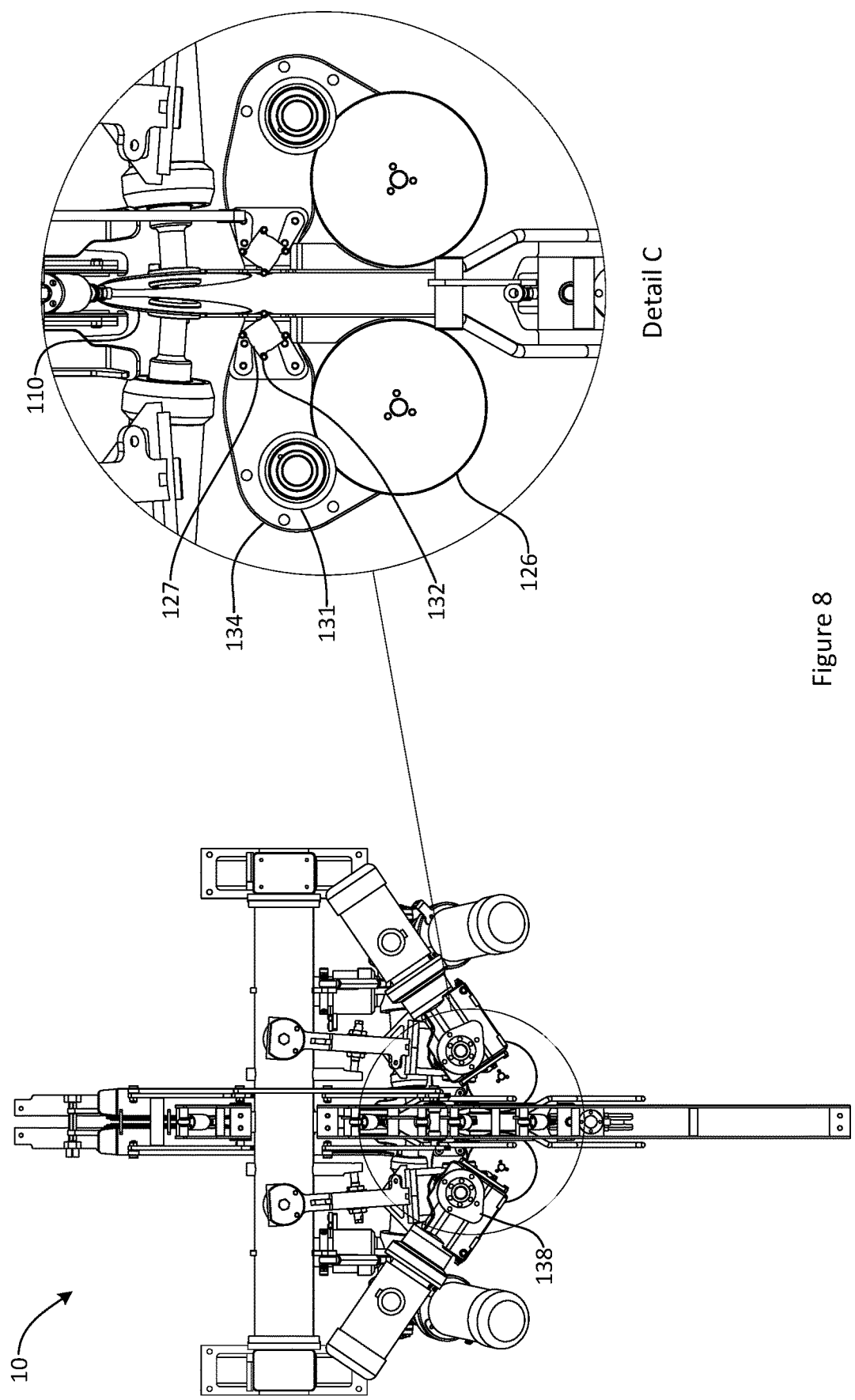
FIG. 8 is a top view showing a detail of the first carcass processing assembly of FIG. 7.
Figure 9:
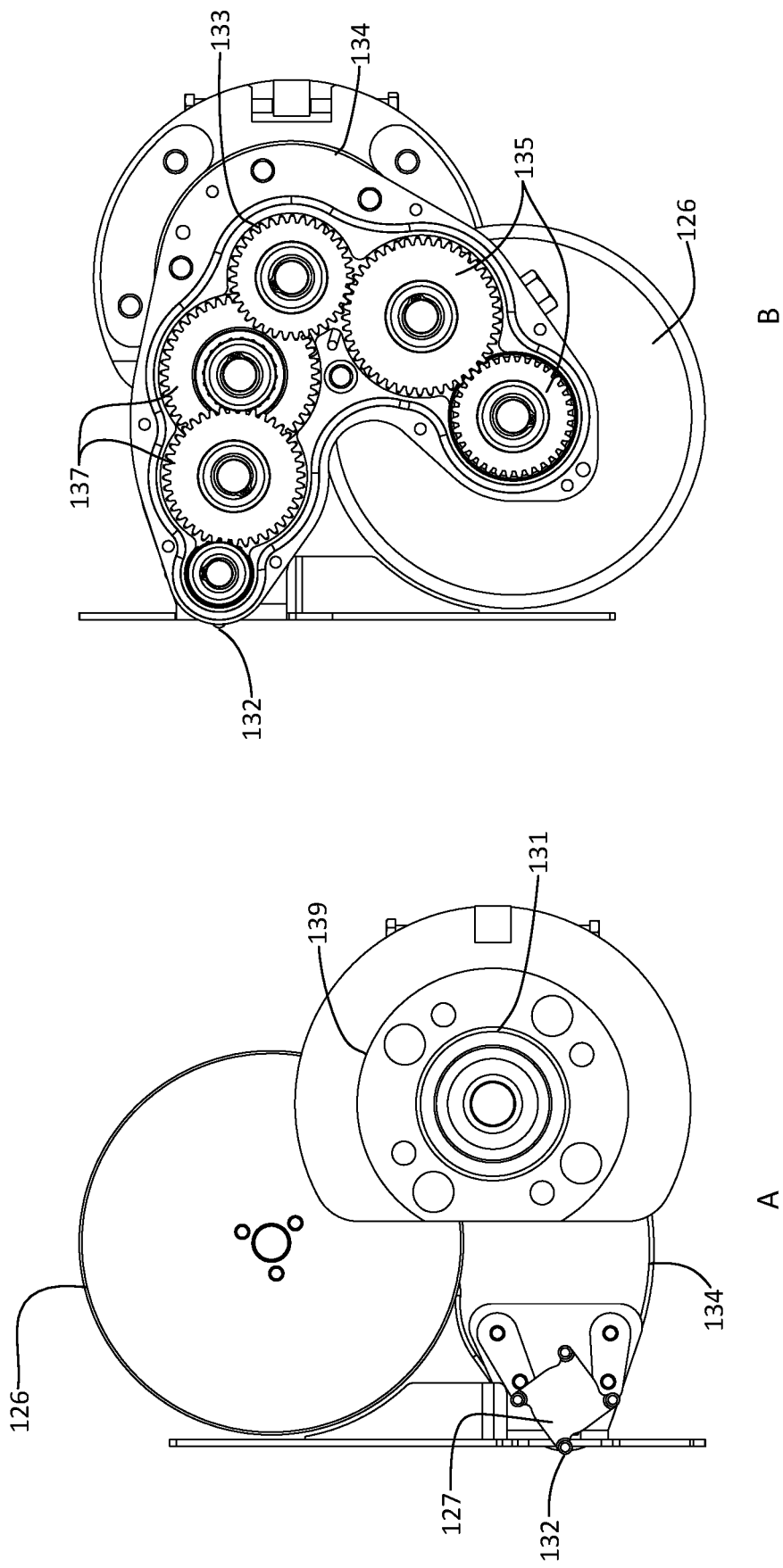
FIG. 9A is a top view of a detail of the carcass processing assembly of FIG. 7.
FIG. 9B is a bottom view of the detail of FIG. 9A.

In the side view of FIG. 4 it can also be seen that the first carcass processing assembly 10 is arranged to operate on the ventral (i.e. downward-facing in FIG. 4) side of the section of carcass and the second carcass processing assembly 15 is arranged to operate on the dorsal (i.e. upward-facing) side. The blades 102, 110 of the first processing assembly 10 are located mostly underneath the path through the carcass processing machine 1. The first processing assembly 10 may also include substantially horizontal blades (shown as 126 in FIGS. 7 to 9) and rotating members (shown as 127 in FIGS. 8 and 9). The horizontal blades 126 and rotating members 127 may be downstream of the substantially vertical blades 110, although they are best shown in the views of FIGS. 7-9.

Figure 5:
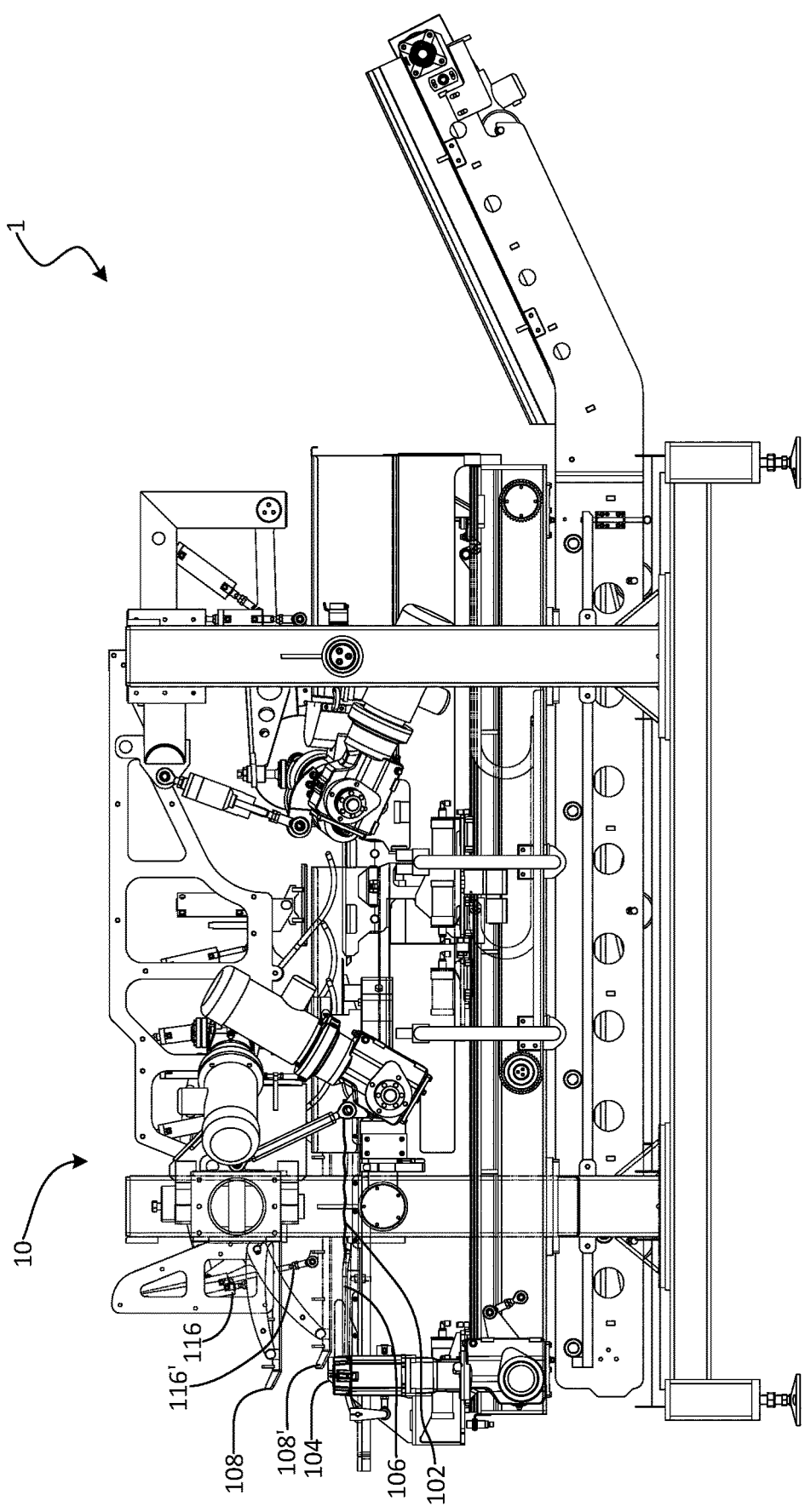
FIG. 5 is a side view of the carcass processing machine as shown in FIG. 2.

FIG. 5 illustrates the action of parts of the carcass processing machine 1 when the section of carcass is loaded into the machine 1. As already described, the section of carcass is loaded onto the support bars 106. Initially, the holder 108 is in the raised position (indicated by solid lines). The holder 108 is then pushed down by the actuator 116 to the position 108' (indicated by dashed lines). The actuator 116 is initially retracted in the position 116 to raise the holder and extends to the position 116' to lower the holder 108. The pusher 104 may then push the section of carcass over the knives 102 and through the first carcass processing assembly 10.

Figure 6:
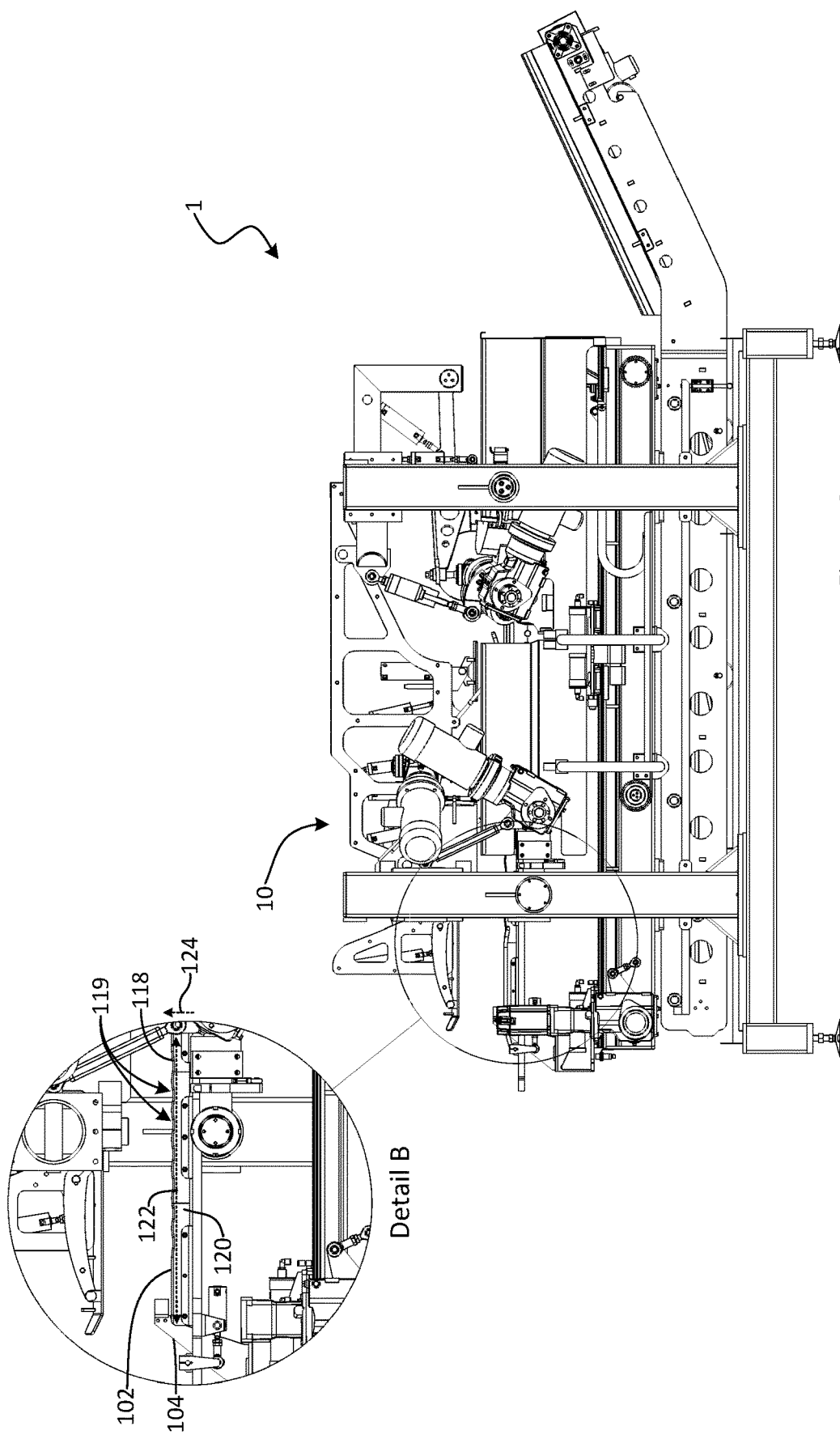
FIG. 6 is another side view showing a detail of the carcass processing machine as shown in FIG. 2.

FIG. 6 shows the carcass processing machine 1 from the side, with features of the first processing assembly 10 in Detail B. In particular, Detail B shows the shape of a knife 102. The knife 102 is elongate, with a length indicated at 122. The knife 102 has a base 120 and a cutting feature 118. The knife has a height 124, the height being in the direction from the base 120 to the cutting feature 118. In some examples, the knife 102 may be oriented vertically with the cutting feature 118 facing upwards, meaning that the height 124 is also measured vertically. In alternative examples in which the knife 102 is at a different orientation, the height would still be measured from the base to the cutting feature, i.e. the height is measured with reference to the blade 102, not an external reference frame.

In some examples, such as the example of FIG. 6, the knife 102 has a single knife blade. In these examples, the cutting feature 118 may be the cutting edge of the single knife blade. In other examples, the knife may have two or more blades. In these examples, the cutting feature may be composed of the edges of the two or more blades. For example, the knife may include two or more circular blades arranged in a row. The circular blades may be rotating or non-rotating blades. In other examples, the knife may include two or more blades of other shapes, such as a row of straight-edged blades at different angles from each other.

As can be seen in Detail B, the edge of the knife 102 is not straight when viewed from the side. In other words, the height 124 varies along the length 122 of the knife 102. It has been found that when moving a section of carcass along a knife, the section of carcass is less likely to catch on the knife and go off course (e.g. veer right or left) if the knife has variations in its height, rather than having a straight cutting feature. The variations in height may temporarily decrease pressure between the section of carcass and the knife and reduce the contact patch between the two. This may help to allow the section of carcass to self-align on the knife as it is moved, e.g. as it is pushed along by the pusher 104.

Various different cutting feature shapes may be suitable for use with the knife 102. In some examples, the knife can have one or more dips 119 along the length of the cutting feature 118. A series of several dips 119 along the knife may allow the pressure between the section of carcass and the knife 102 to be repeatedly relieved as the section of carcass moves over the knife 102. The repeated dips 119 may provide a wave shape. In the example of FIG. 6, the height of the knife 102 is a smooth undulation.

In the example of FIG. 6, the knife 102 is a single blade and the variations in height—e.g. dips, wave shape, or undulations—are formed in the single blade. In examples in which the knife 102 is made up of more than one blade, the variations in height may be provided by the combination of the blades. For example, when the knife is made up of circular blades, the tops of the circular blades provide a cutting feature at the top of the knife in the shape of a row of circular arcs. In such a shape, dips are formed in the regions between two adjacent circular blades. In another example, when the knife 102 is made up of a series of straight-edged blades, the blades may be alternately "inclined" and "declined" along the direction of travel of the section of carcass. This may provide a cutting feature in the form of a saw-tooth or triangular wave.

FIG. 7 shows the first carcass processing assembly 10 in isolation. As already noted, the first carcass processing assembly 10 may be arranged to remove a portion of meat from the ventral side of a section of carcass and in particular may be used to remove a tenderloin. The first carcass processing assembly 10 of FIG. 7 is configured to process a "full section" of carcass including left and right sides, removing portions of meat from both sides. References to singular blades, blade mounts, rotating members etc. therefore also relate to equivalent elements arranged at the opposite side of the section of carcass. In alternative examples, a first carcass processing assembly may be arranged to process only "half section" of carcass, and the blades, blade mounts, rotating members etc. may be singular elements arranged to process one side of the section of carcass.

FIG. 7 shows the blade 126 that is downstream (in the direction 3) of the vertical blade 110 of FIG. 4. This blade 126 may be arranged to cut along the underside of the transverse processes of the vertebrae and make a cut that intersects with the cut produced by the upstream blades, thereby separating the portion of meat from the section of carcass. In the symmetrical assembly of FIG. 7, there is a matching blade to blade 126 on the other side of the carcass processing assembly 10.

The blades 126 are mounted on blade mounts 128. Also shown in FIG. 7 are the blade mounts 130 for the blades 110. The blade mounts 128 and 130 are mounted to the frame section 76 of the first processing assembly 10. Pivot arms 136 are also provided and connect the blade mounts 128 to the frame section 76, allowing for lateral movement of the blades 126 to accommodate variations in vertebrae geometry.

FIG. 8 is top view of the first carcass processing assembly 10. The blades 110 and 126 are best shown in Detail C, in which some components have been hidden for clarity. Also shown in Detail C is the rotating member 127. The rotating member 127 is arranged to rotate about a substantially vertical axis, with its upstream surface which contacts the meat moving outwards from the vertebral bodies. In the orientation shown in Detail C, the rotating member 127 on the left would rotate counter-clockwise. The rotating member 127 may be positioned close to the vertebrae and may contact large vertebrae.

The rotating member 127 may act to pull a portion of meat outwards away from the vertebral bodies, which may allow the portion of meat to come cleanly away from the bone. The rotating member 127 may prevent the portion of meat from bunching up during processing by placing it under tension. The rotating member 127 may be particularly useful for helping to remove tenderloins, which are quite delicate portions of meat, relatively intact. The blades 126, which are downstream of the rotating members 127, are arranged to cut the outer fibres of the tenderloin. The rotating member 127 may separate the portion of meat without itself substantially cutting the section of carcass.

In the example of FIG. 8, the rotating member 127 can be a wheel. Other forms of rotating member such as circulating belts may also be suitable, if designed appropriately. The rotating members may have grip-enhancing features to help them grip the meat. The grip-enhancing features may improve force transfer from the rotating members 127 to the portion of meat. The grip-enhancing features may include protrusions 132 as shown in FIG. 8. The grip-enhancing features may include one or more sharp edges.

In some examples, the blades 126 are rotating blades and may be driven by the same drives as the rotating members 127. For example, in FIG. 8 the motors 138 may drive both the rotating members 127 and the blades 126. Each motor 138 may mount to the gear box 134 at the hub 131.

The configuration of the gear box 134 is best shown in FIG. 9.

FIG. 9A shows the blade 126 and rotating member 127 along with the mounting plate 139 that may be used to mount the blade 126 and rotating member 127 to the mount 128.

FIG. 9B shows the underside of the assembly of FIG. 9A. In FIG. 9B, the bottom plate of the gear box 134 is hidden to show the drive train that allows the blade 126 and rotating member 127 to be driven from the hub 131. Gear 133 is driven via the hub 131. Gear 133 drives the blade 126 via gears 135. Gear 133 drives the rotating member 127 via gears 137. The rotating member 127 may be driven with a higher ratio than the blade 126, allowing the rotating member 127 to have a lower rotational frequency than the blade 126. For example, the rotating member 127 may rotate at approximately half the frequency of the blade 126. In some examples, the rotating member 127 may be driven by a reduction gearing.

In the example of FIG. 9, the blade 126 may be driven with an approximately 1:1 gear ratio and the rotating member may be driven with an approximately 2:1 gear ratio.

FIGS. 9A and 9B also show how the protrusions 132 of the rotating member 127 may project beyond the housing of the gear box 134 to make contact with the portion of meat during processing.

Figure 10:
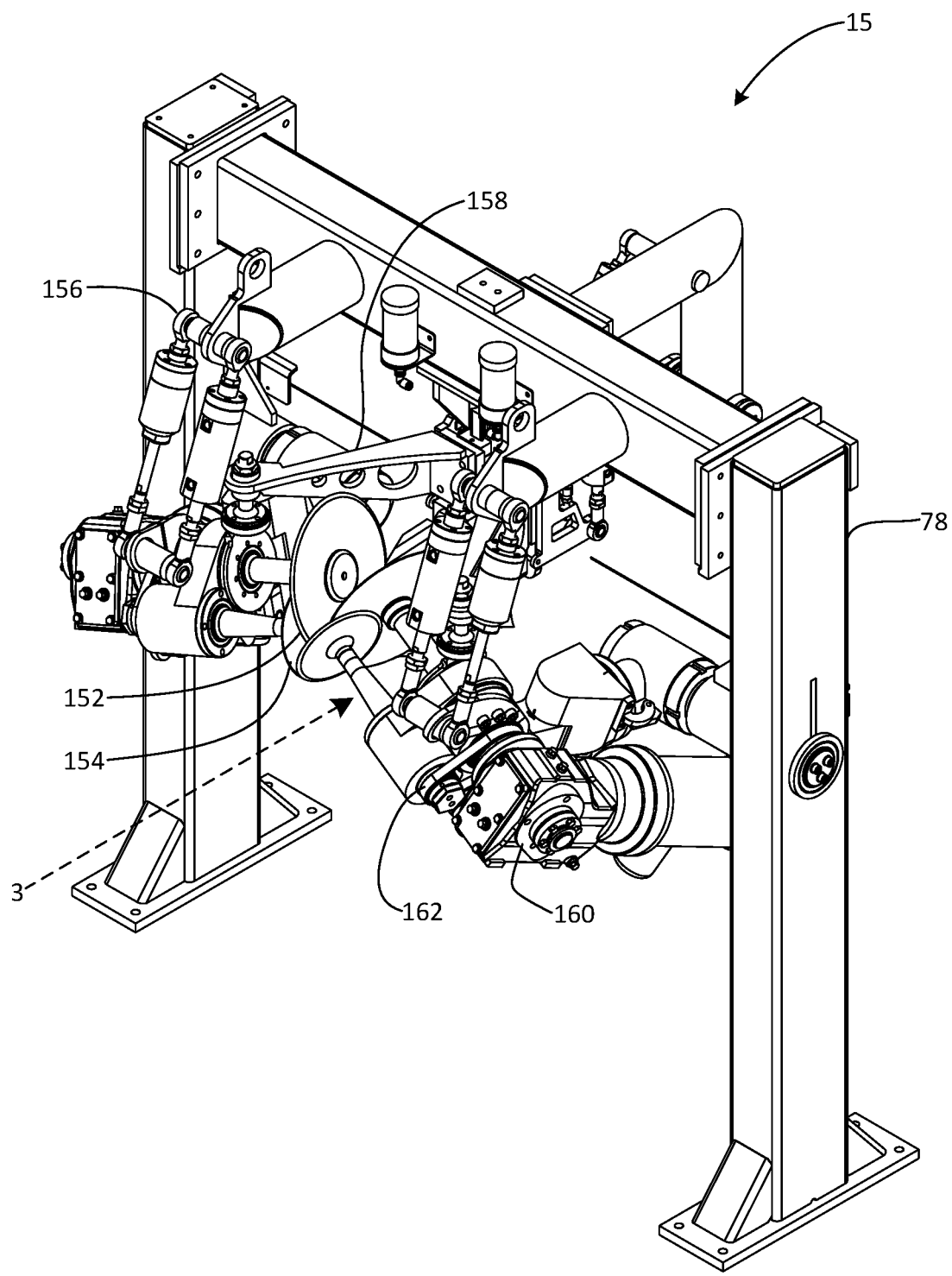
FIG. 10 is an isometric view of a second carcass processing assembly according to one example.

FIG. 10 shows the second carcass processing assembly 15 in isolation. As already noted, the second carcass processing assembly 15 may be arranged to remove a portion of meat from the dorsal side of a section of carcass and in particular may be used to remove an eye muscle/boneless loin. The second carcass processing assembly 15 of FIG. 10 is configured to process a "full section" of carcass including left and right sides, removing portions of meat from both sides. References to singular blades, blade mounts, linkages etc. therefore also relate to equivalent elements arranged at the opposite side of the section of carcass. In alternative examples, a second carcass processing assembly may be arranged to process a "half section" of carcass, and the blades, blade mounts, linkages etc. may be singular elements arranged to process one side of the section of carcass.

The second processing assembly 15 may include a first blade 152. The first blade 152 may be angled and positioned to fit around the mamillary processes 184 of the vertebra. The first blade 152 may at an angle of less than 45° to the vertical. The first blade 152 may be angled outwards along the path of travel of the section of carcass to help urge the portion of meat away from the spinous processes 182 and mamillary processes 184. The first blade 152 may be a rotating blade configured for climb cutting of the section of carcass. In some examples, the first blade 152 may rotate at approximately 670 revolutions per minute (approximately 11 hertz). In alternative examples, a fixed (non-rotating) blade may be used. The first blade 152 may be configured to follow or ride along the dorsal surfaces of the vertebrae during processing of the section of carcass. This may be achieved by mounting the first blade 152 in a movable manner. For example, the blade mount 156 may be compliant to allow the blade 152 to move to vertically and/or horizontally to accommodate different vertebrae geometries. Compliance may be provided by one or more compliant members. The compliant members may be springs. In some examples, the compliant members are gas springs.

The second processing assembly 15 may include a second blade (shown as blade 170 in FIGS. 11-14). The second blade 170 may be arranged to separate meat from the dorsal side of the transverse processes 183 of the vertebrae. The second blade 170 may be linked to the first blade 152 by linkage 158 such that movement of the first blade 152 causes movement of the second blade 170. This may allow the second blade 170 to also accommodate different vertebrae geometries. The second blade 170 may be a plough blade. The second blade 170 and its movement are best shown in FIGS. 11-14.

A third blade 154 may also be provided. The third blade 154 may be arranged to separate meat from the spinous processes 182 of the vertebrae. The third blade 154 may be angled and positioned to fit into the region 185 between the spinous process 182 and the mamillary process 184, also referred to as the "shoulder". This third blade 154 may follow or ride along the shoulder 185. The third blade 154 may be angled at less than 45° to the vertical and may be at a similar angle as the first blade 152. The third blade 154 may be angled outward along the path of travel 3 to help urge a portion of meat away from the spinous processes 182 of the vertebrae. The third blade 154 may be mounted to the blade mount 156 and may move with movement of the first blade 152. The third blade 154 may also be movable with respect to the first blade 152. The third blade 154 may be mounted to the blade mount 156 by a mounting member that allows for the relative movement between the first blade 152 and third blade 154. For example, the mounting member may act as a pivoting linkage allow pivoting movement between the two blades. The movement of the third blade 154 may allow it to accommodate variations in vertebrae geometry in the shoulder region 185. The third blade 154 may be a rotating blade configured for climb cutting. In alternative examples, a fixed (non-rotating) blade may be used. The third blade 154 may be driven from the same drive as the first blade 152. In the example of FIG. 10, the first and third blades 152, 154 are driven by motor 160. The motor 160 may drive the third blade 154 via a slave belt 162. In some examples, the third blade 154 may be driven at a higher rotational speed than the first blade 152. In some examples, the third blade 154 may be driven at approximately ³⁄₂ the rotational speed of the first blade 152. In one example, the third blade 154 may operate at approximately 1000 revolutions per minute (approximately 17 hertz).

The first blade 152 and third blade 154 may cooperate to remove a portion of meat from the dorsal side of the section of carcass substantially as described in NZ Pat. No. 757048 in relation to blades 11 and 12 of that patent.

The processing assembly 15 has frame elements 78 that the blade mount 156 and linkage 158 can be mounted to.

Figure 11A:
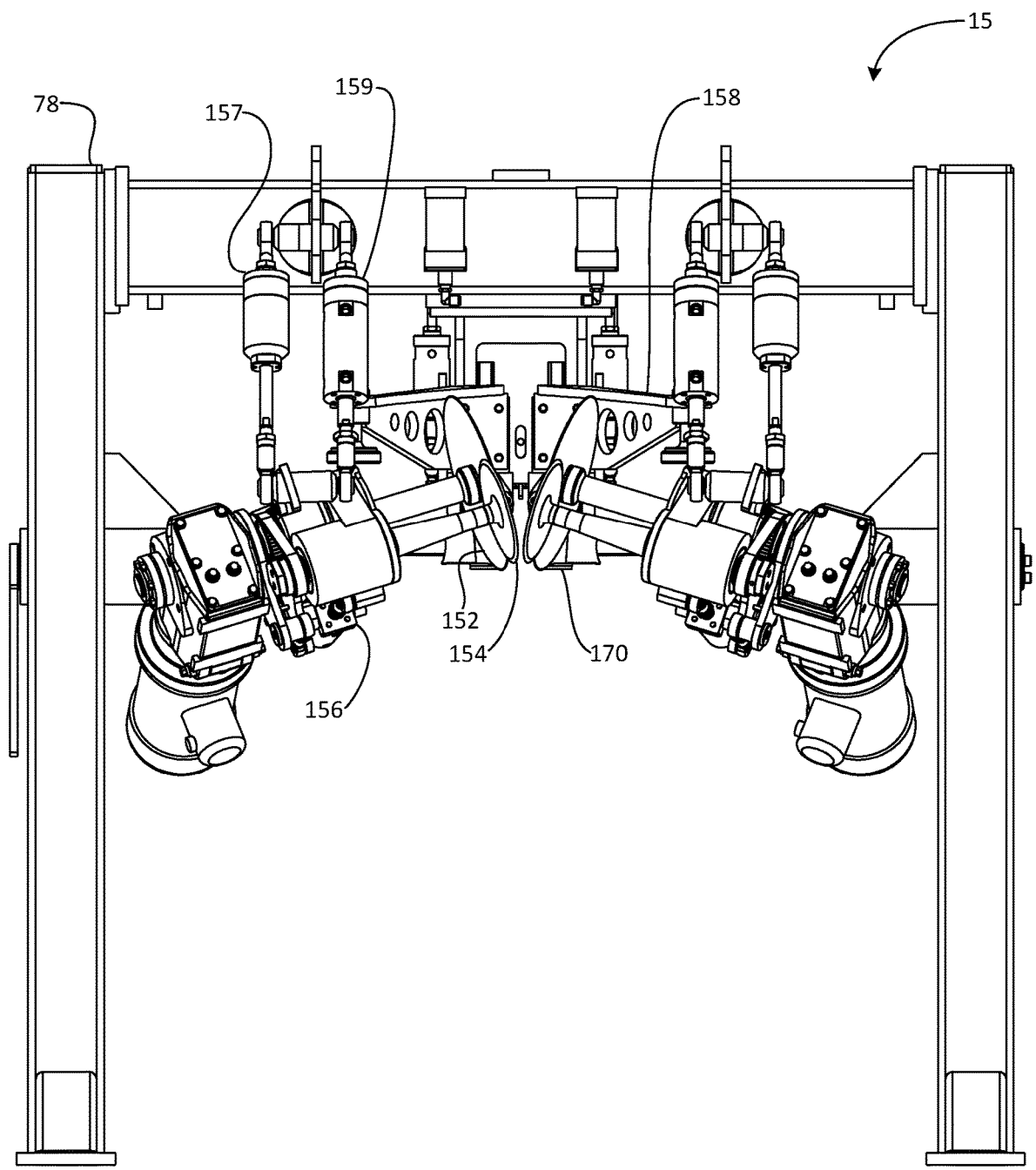
FIG. 11A is a front view of the carcass processing assembly of FIG. 10.
Figure 11B:
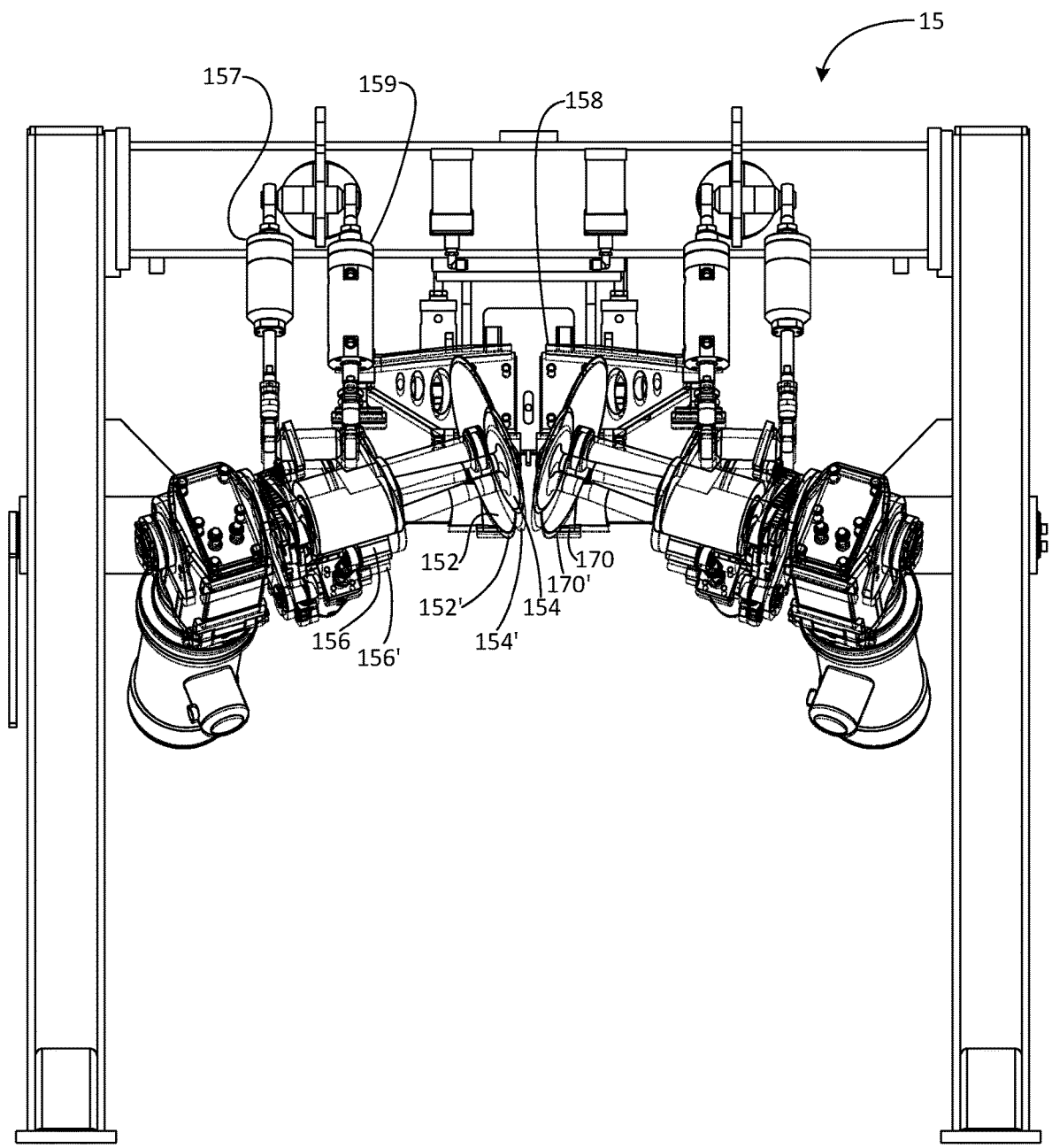
FIG. 11B is another front view of the carcass processing assembly of FIG. 10 illustrating a movement of the assembly.

In FIGS. 11A and 11B, the processing assembly 15 is shown from the front (i.e. looking along the direction 3 of FIG. 10). The "neutral" or "rest" configuration of the processing assembly 15 is shown in FIG. 11A. The blade mount 156 is in a lowered position, with the compliant members 157 and 159 (in this example gas springs) in extended positions. The blade 152 is therefore also in the lowered position. This allows the linkage 158 to move the blade 170 into the lowered position, following the blade 152. The blade 154 is also lowered.

In FIG. 11B, the blade 152 has moved upwards into the position indicated in solid lines. The neutral or rest position is shown in dashed lines at 152'. This may happen when the blade 152 encounters a larger or higher vertebra. The blade mount 156 has moved up from the position indicated at 156'. Linkage 158 drives blade 170 to also move up from the rest position indicated at 170'. The gas springs 157, 159 are somewhat retracted in this configuration.

It can be seen that the third blade 154 has also moved up from the position 154'. The third blade 154 has moved up further than the second blade 152 has. This is possible due to the relative movability of the first and third blades 152, 154, and may happen when the third blade 154 encounters a vertebrae with a high shoulder 185 or mamillary process 184.

FIG. 12 shows the processing assembly 15 from the side, along with further details of the linkage 158. The blade mount 156 has a bearing surface on 164. The linkage 158 includes a follower 166 that contacts the bearing surface 164. The bearing surface 164 may prevent the follower 166 from going below a certain height. Thus the position of the blade 152 may set the minimum height of the blade 170. In some examples, the bearing surface 164 may be the surface of a protrusion. In some examples, the protrusion may be in the form of a cam.

Figure 12A:
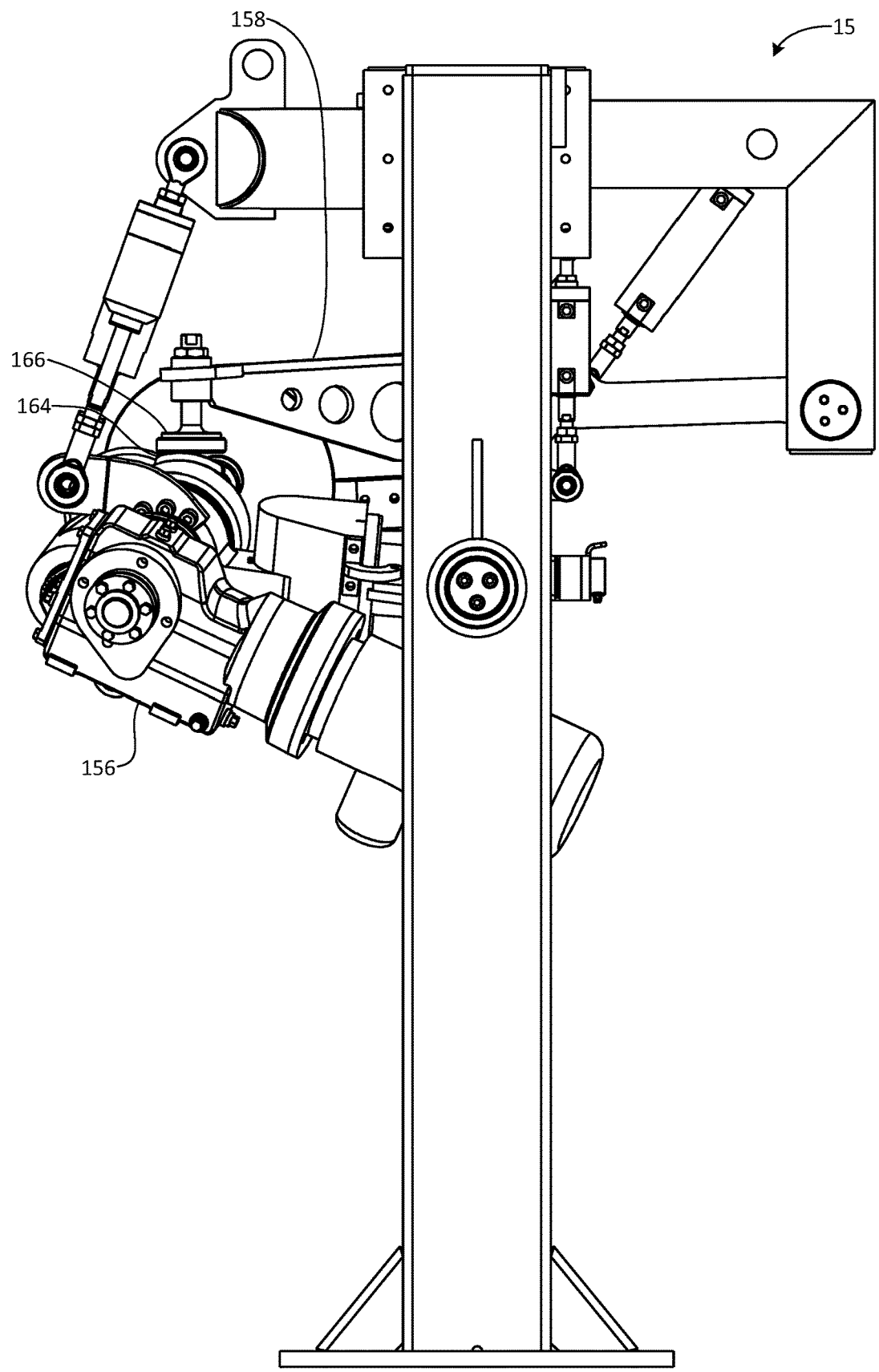
FIG. 12A is a side view of the carcass processing assembly of FIG. 10.
Figure 12B:
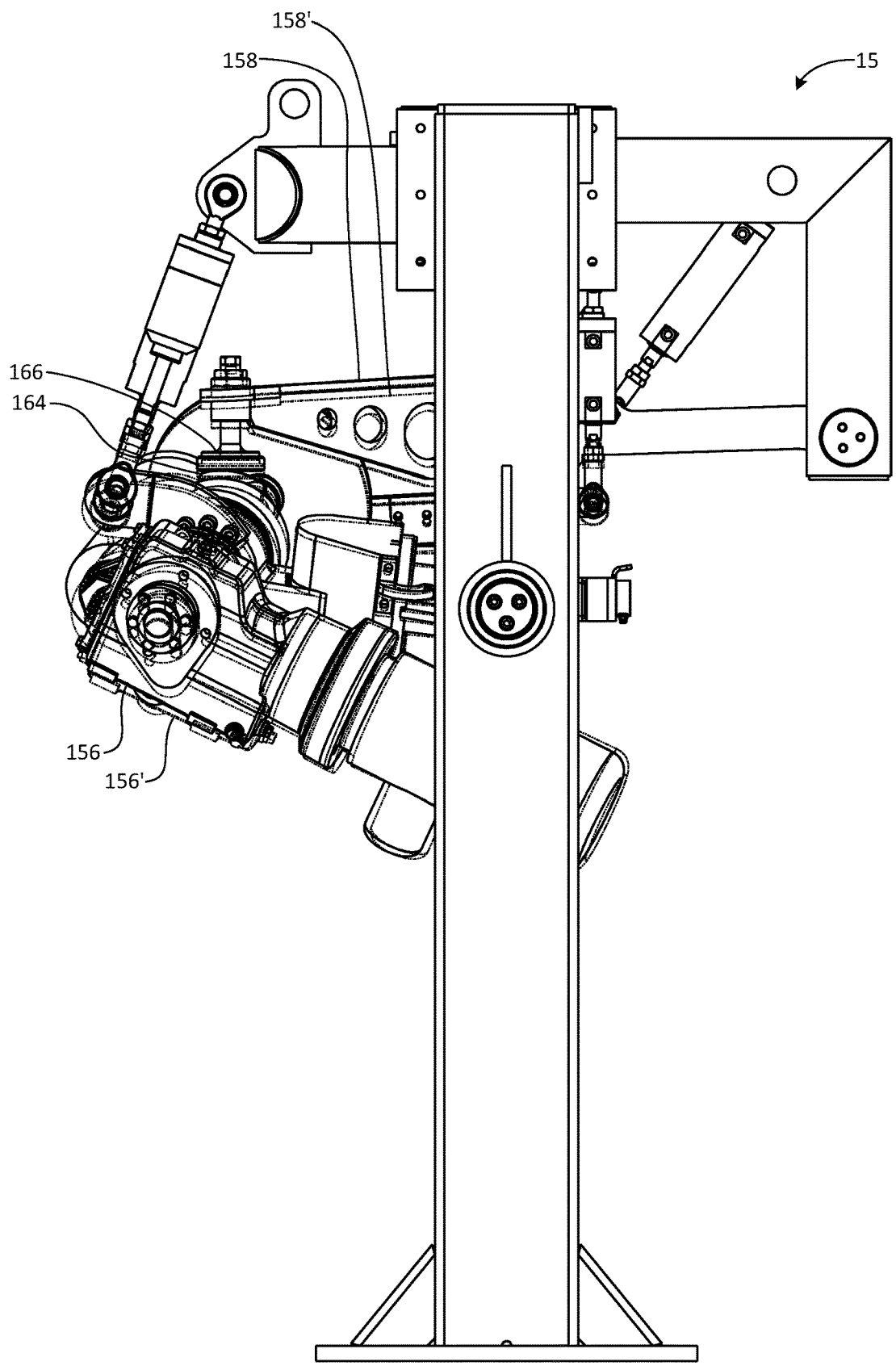
FIG. 12B is another side view of the carcass processing assembly of FIG. 10 illustrating a movement of the assembly.

In FIG. 12A, the processing assembly 15 is in the neutral or rest configuration. In FIG. 12B, the blade mount 156 has moved up, driving the follower 166 upwards via the bearing surface 164. The linkage 158 has moved up from the rest position indication in dashed lines at 158'. As shown in more detail in FIG. 13, the linkage is connected to the blade 170, causing it to also move upwards.

In some examples, the blade 170 may be able to undergo some movement relative to the blade 152. In particular, the blade 170 may be able to move upwards relative to the blade 152. This may allow the blade 170 to move up and over large or high transverse processes when it encounters them. In the exemplary linkage 158 of FIG. 12, the follower 166 may move upwards off the bearing surface 164 but may not move below it.

Figure 13:
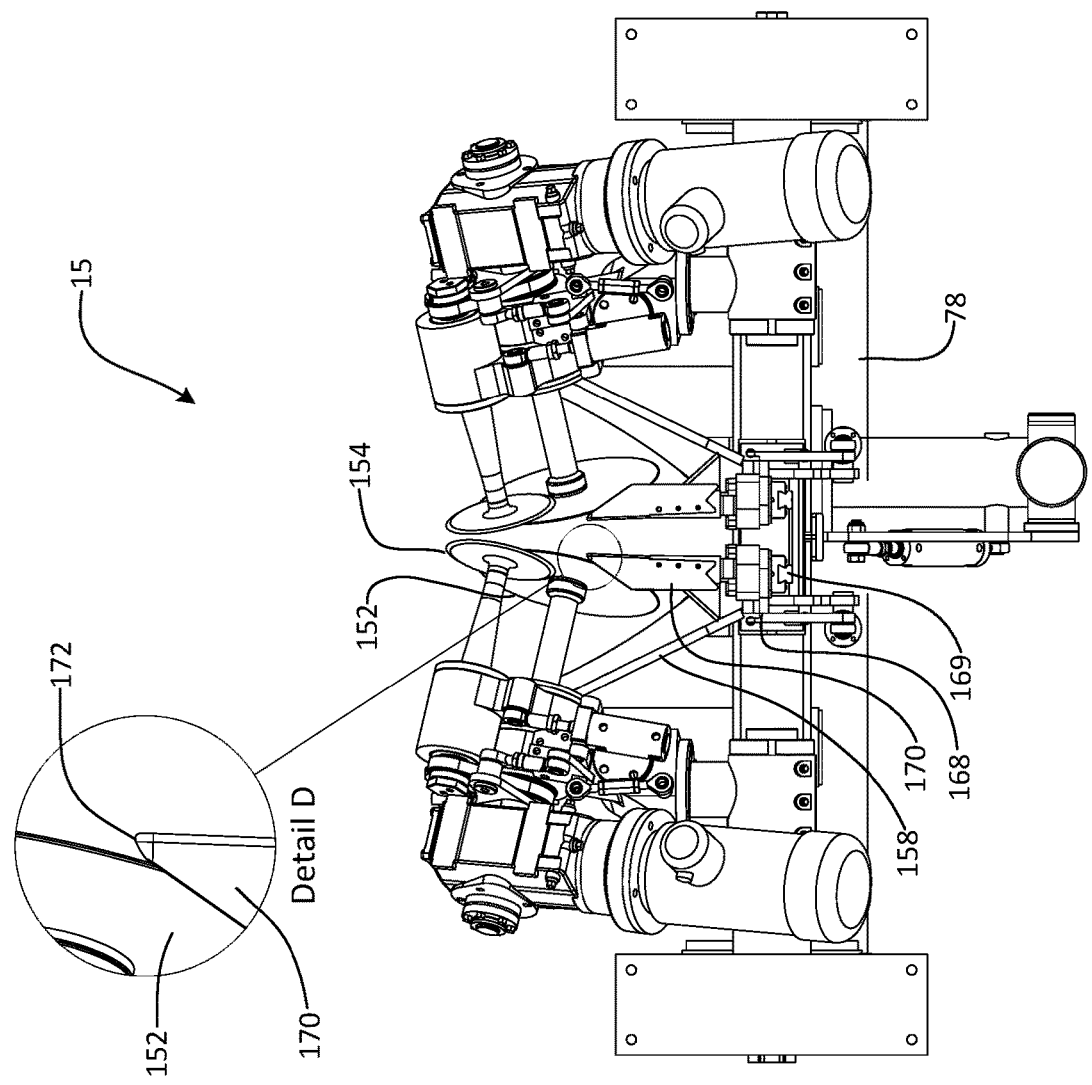
FIG. 13 is a bottom view of the carcass processing assembly of FIG. 10.

FIG. 13 shows the assembly 15 from the underside. In addition to the first blade 152 and third blades 154, the second blade 170 is shown. The second blade 170 may be mounted to the blade mount 168. The blade mount 168 may be connected to the linkage 158. The blade mount 168 may be movable mounted to the frame elements 78 of the second processing assembly 15 at 169. In some examples, the blade mount 168 may be mounted for substantially linear vertical movement. In some examples, the blade mount 168 may be mounted to a rail. In the example of FIG. 13, the blade mount 168 is mounted on a linear rail 169 with a dovetail profile.

As shown in FIG. 13, the blade 170 is a plough blade. The plough blade may be arranged downstream of the first blade 152 and third blade 154. The blade 170 may have a tip that is arranged to locate in close to the vertebral bodies of the vertebrae during processing. The tip 172 is shown in Detail D. The tip 172 may be rounded. This may reduce the chance of the tip 172 digging into vertebrae during processing and may allow it to follow along close to the vertebral bodies. The tip 172 may push vertebrae to the side when it encounters them, rather than digging into them. The tip 172 may be blunt, rather than sharp, which may reduce the chance of it digging into vertebrae.

The blade 170 may follow closely behind the blade 152. As already described, the blade 152 separates a portion of meat from the side of the mamillary processes 184. The tip 172 of the blade 170 is arranged so that it can enter this separation when it meets the section of carcass. This means that the tip 172 of the blade 170 does not need to be sharp or pointed. The tip 172 does not need to initiate a cut, it only needs to extend the cut across the transverse processes 183.

Figure 14:
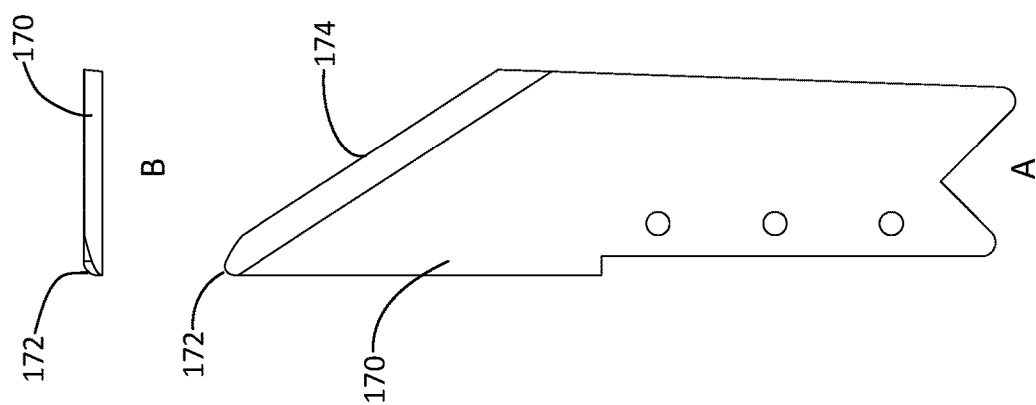
FIG. 14A is a top view of a plough blade according to one example.
FIG. 14B is a front view of the plough blade of FIG. 14A.

FIG. 14 shows details of the plough blade 170. FIG. 14A is a top view of the blade labelled 170 in FIG. 13. FIG. 14b Is a front view (i.e. viewed along the direction 3 in FIG. 10). The blade 170 has a rounded tip 172 and a sharp leading edge 174. The sharp leading edge 174 is provided to cut the portion of meat from the transverse processes 183.

The carcass processing machine and carcass processing assemblies described and claimed herein may facilitate effective removal of portions of meat from sections of carcass that include vertebrae, such as tenderloins and eye muscles/boneless loin from a shortloin section. They may result in improved quality of the resulting meat products. They may result in improved movement of the section of carcass through the carcass processing assemblies without blades digging into the vertebrae. They may improve the ability of the section of carcass to be conveyed through the carcass processing assemblies along a desired path without going off course.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A carcass processing assembly for at least partly separating a portion of meat from a section of carcass, the section of carcass including vertebrae, the carcass processing assembly including:
   one or more blades configured to partly separate the portion of meat from the section of carcass;
   a rotating member downstream from at least one of the one or more blades, the rotating member configured to contact the portion of meat after the one or more blades partly separate the portion of meat from the section of carcass; and
   a drive assembly configured to drive movement of the rotating member relative to the section of carcass, wherein a part of the rotating member that is in contact with the partly separated portion of meat moves outwardly from the vertebrae to urge the partly separated portion of meat away from the vertebrae.

2. The carcass processing assembly of claim 1, wherein the rotating member rotates about an axis substantially parallel to a dorso-ventral axis of the vertebrae to urge the partly separated portion of meat laterally away from the vertebrae.

3. The carcass processing assembly of claim 1, wherein the rotating member is a wheel.

4. The carcass processing assembly of claim 1, wherein the rotating member has one or more grip-enhancing features on its surface to improve grip between the rotating member and the partly separated portion of meat, wherein the one or more grip-enhancing features include one or more protrusions and/or sharp edges.

5. The carcass processing assembly of claim 1, further including one or more blades downstream of the rotating member, the one or more blades downstream configured to cut remaining connections between the partly separated portion of meat and the section of carcass.

6. A carcass processing machine including:
   the carcass processing assembly of claim 1;
   an elongate knife arranged to contact the section of carcass, the elongate knife having a base, a length along the elongate knife, a cutting feature at an edge of the elongate knife and extending along the length of the elongate knife, and a height in a direction from the base to the cutting feature, wherein the elongate knife includes one or more knife blades and wherein the height of the elongate knife varies along the length of the elongate knife; and
   transportation means configured to move the section of carcass along the elongate knife to cut the section of carcass;
   wherein at least one blade that the rotating member is downstream of in the carcass processing assembly of claim 1 includes the elongate knife.

7. The carcass processing machine of claim 6 further including a second carcass processing assembly for at least partly separating a second portion of meat from a dorsal side of a section of carcass, the second carcass processing assembly including:
   a first movably mounted blade arranged to at least partly separate meat from the vertebrae, the first movably mounted blade arranged to follow a dorsal surface of the vertebrae between mamillary processes and transverse processes of the vertebrae, wherein the first movably mounted blade is angled and positioned to fit around the mamillary processes of the vertebrae;
   a second movably mounted blade arranged to at least partly separate meat from the vertebrae, the second movably mounted blade arranged to follow a dorsal surface of the vertebrae between spinous processes and mamillary processes of the vertebrae;
   a third movably mounted blade arranged to at least partly separate meat from the dorsal side of the transverse processes of the vertebrae; and a linkage between the first movably mounted blade and the third movably mounted blade, configured such that movement of the first movably mounted blade causes movement of the third movably mounted blade;

wherein the first movably mounted blade and the second movably mounted blade are mounted to be movable relative to each other.

8. A carcass processing assembly for at least partly separating a portion of meat from a dorsal side of a section of carcass, the section of carcass including vertebrae, the carcass processing assembly including:

a first movably mounted blade arranged to at least partly separate meat from the vertebrae, the first movably mounted blade arranged to follow a dorsal surface of the vertebrae between mamillary processes and transverse processes of the vertebrae, wherein the first movably mounted blade is angled and positioned to fit around the mamillary processes of the vertebrae; and a second movably mounted blade arranged to at least partly separate meat from the vertebrae, the second movably mounted blade arranged to follow a dorsal surface of the vertebrae between spinous processes and mamillary processes of the vertebrae;

wherein the first movably mounted blade and the second movably mounted blade are mounted to be movable relative to each other.

9. The carcass processing assembly of claim 8, further including a linkage between the first movably mounted blade and the second movably mounted blade, the linkage allowing relative pivoting between the first movably mounted blade and the second movably mounted blade.

10. The carcass processing assembly of claim 8, wherein the first movably mounted blade is movably mounted to a fixed structure of the carcass processing assembly by a first blade mount and wherein the second movably mounted blade is movably mounted to the first blade mount by a second blade mount.

11. The carcass processing assembly of claim 8, wherein the first movably mounted blade and the second movably mounted blade are rotating blades.

12. The carcass processing assembly of claim 8, further comprising:

a third movably mounted blade arranged to at least partly separate meat from the dorsal side of the transverse processes of the vertebrae; and a linkage between the first movably mounted blade and the third movably mounted blade, configured such that movement of the first movably mounted blade causes movement of the third movably mounted blade.

13. The carcass processing assembly of claim 12, wherein the third movably mounted blade is a plough blade.

14. A carcass processing assembly for at least partly separating a portion of meat from a dorsal side of a section of carcass, the section of carcass including vertebrae, the carcass processing assembly including:

a first movably mounted blade arranged to at least partly separate meat from the vertebrae, the first movably mounted blade arranged to follow a dorsal surface of the vertebrae;

a second movably mounted blade arranged to at least partly separate meat from the dorsal side of a transverse processes of the vertebrae; and a linkage between the first movably mounted blade and the second movably mounted blade, configured such that movement of the first movably mounted blade causes movement of the second movably mounted blade.

15. The carcass processing assembly of claim 14, wherein the second movably mounted blade is mounted for movement substantially parallel to a dorso-ventral axis of the vertebrae.

16. The carcass processing assembly of claim 14, wherein the linkage is configured to set a maximum excursion in a ventral direction of the second movably mounted blade relative to the first movably mounted blade.

17. The carcass processing assembly of claim 14, wherein the linkage allows the second movably mounted blade to move in a dorsal direction independently of the first movably mounted blade.

18. The carcass processing assembly of claim 14, wherein the second movably mounted blade is a plough blade.

19. The carcass processing assembly of claim 18, wherein a tip of the plough blade that is located towards a vertebral bodies of the vertebrae during processing is rounded.

20. The carcass processing assembly of claim 14, wherein the first movably mounted blade is a rotating blade.

* * * * *